(12) United States Patent
Blomquist

(10) Patent No.: US 7,607,093 B2
(45) Date of Patent: Oct. 20, 2009

(54) DISPLAYING NETWORK SEGMENT DECODE INFORMATION IN DIAGRAMMATIC FORM

(75) Inventor: Scott Alan Blomquist, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1060 days.

(21) Appl. No.: 10/407,341

(22) Filed: Apr. 4, 2003

(65) Prior Publication Data

US 2004/0196308 A1 Oct. 7, 2004

(51) Int. Cl.
G06F 15/177 (2006.01)
G06F 15/163 (2006.01)
(52) U.S. Cl. ............... 715/736; 370/241; 370/248; 370/249; 370/250; 375/228; 379/23; 709/224
(58) Field of Classification Search ............ 715/734, 715/736
See application file for complete search history.

(56) References Cited

U.S. PATENT DOCUMENTS

| | | | | |
|---|---|---|---|---|
| 5,787,253 A | * | 7/1998 | McCreery et al. | 709/231 |
| 5,850,388 A | * | 12/1998 | Anderson et al. | 370/252 |
| 5,889,954 A | * | 3/1999 | Gessel et al. | 709/223 |
| 5,933,602 A | * | 8/1999 | Grover | 709/224 |
| 6,041,347 A | * | 3/2000 | Harsham et al. | 709/220 |
| 6,115,393 A | * | 9/2000 | Engel et al. | 370/469 |
| 6,219,050 B1 | * | 4/2001 | Schaffer | 715/853 |
| 6,353,446 B1 | * | 3/2002 | Vaughn et al. | 715/733 |
| 6,381,641 B1 | * | 4/2002 | Iwasaki | 709/224 |
| 6,446,028 B1 | * | 9/2002 | Wang | 702/186 |
| 6,505,245 B1 | * | 1/2003 | North et al. | 709/223 |
| 6,526,044 B1 | * | 2/2003 | Cookmeyer et al. | 370/352 |
| 6,584,501 B1 | * | 6/2003 | Cartsonis et al. | 709/224 |
| 6,608,817 B1 | * | 8/2003 | Ivory | 370/250 |
| 6,639,607 B1 | * | 10/2003 | Ferguson et al. | 715/734 |
| 6,687,750 B1 | * | 2/2004 | Messinger et al. | 709/224 |
| 6,708,292 B1 | * | 3/2004 | Mangasarian | 714/39 |
| 6,728,219 B1 | * | 4/2004 | Leong et al. | 370/252 |
| 6,738,933 B2 | * | 5/2004 | Fraenkel et al. | 714/47 |
| 6,745,351 B1 | * | 6/2004 | Mastro | 714/57 |
| 6,757,727 B1 | * | 6/2004 | Ivory | 709/224 |
| 6,810,017 B1 | * | 10/2004 | Leong et al. | 370/241 |
| 6,819,655 B1 | * | 11/2004 | Gregson | 370/242 |
| 6,826,639 B2 | * | 11/2004 | Pasumansky et al. | 710/105 |
| 6,892,287 B1 | * | 5/2005 | Millard et al. | 711/158 |
| 6,931,574 B1 | * | 8/2005 | Coupal et al. | 714/39 |
| 7,035,903 B1 | * | 4/2006 | Baldonado | 709/206 |
| 7,047,297 B2 | * | 5/2006 | Huntington et al. | 709/224 |

(Continued)

OTHER PUBLICATIONS

Sharpe et al. "Ethereal user's Guide" 2001.*

(Continued)

*Primary Examiner*—Weilun Lo
*Assistant Examiner*—Steven B Theriault

(57) ABSTRACT

Network analyzing systems and methods are disclosed herein for analyzing a segment of a data communications network. One example of a network analyzing system includes a network analyzer that comprises a frame monitoring device operative to detect frames on the network segment under analysis. The network analyzer further comprises a frame decoder for decoding the frames to provide decode information that is stored on a decode information buffer. A display generating system is operative to create a graphical display view from a portion of the decode information. The graphical display view may be displayed in a graphical user interface of a display device.

40 Claims, 9 Drawing Sheets

U.S. PATENT DOCUMENTS

| | | | |
|---|---|---|---|
| 7,062,680 B2* | 6/2006 | Sirbu | 714/39 |
| 7,254,116 B2* | 8/2007 | Robinson et al. | 370/278 |
| 7,277,957 B2* | 10/2007 | Rowley et al. | 709/231 |
| 2001/0051862 A1* | 12/2001 | Ishibashi et al. | 703/14 |
| 2002/0004829 A1* | 1/2002 | Yasunami | 709/224 |
| 2002/0049330 A1* | 4/2002 | Hannigan | 714/39 |
| 2002/0105911 A1* | 8/2002 | Pruthi et al. | 370/241 |
| 2003/0012163 A1* | 1/2003 | Cafarelli et al. | 370/338 |
| 2003/0088665 A1* | 5/2003 | Sauermann | 709/224 |
| 2003/0135612 A1* | 7/2003 | Huntington et al. | 709/224 |
| 2003/0140137 A1* | 7/2003 | Joiner et al. | 709/224 |
| 2004/0049596 A1* | 3/2004 | Schuehler et al. | 709/238 |
| 2004/0153854 A1* | 8/2004 | Agrawal et al. | 714/43 |
| 2004/0196308 A1* | 10/2004 | Blomquist | 345/734 |
| 2004/0243662 A1* | 12/2004 | Mastro | 709/200 |
| 2005/0027858 A1* | 2/2005 | Sloth et al. | 709/224 |
| 2005/0097536 A1* | 5/2005 | Bernstein et al. | 717/156 |

OTHER PUBLICATIONS

Network Associates, et al. "Sniffer Basic Network Analyzer" 2000.*
Stevens, W. Richard, "UNIX is a Technology Trademark of X/Open Company, Ltd.," 1994, pp. 1-2.

* cited by examiner

DISPLAYING NETWORK SEGMENT DECODE INFORMATION IN DIAGRAMMATIC FORM

TECHNICAL FIELD

The present disclosure generally relates to analyzing a segment of a data communications network. More particularly, the disclosure relates to systems and methods for graphically displaying characteristics of frames travelling through a network segment under analysis.

BACKGROUND

Networks are formed by computers, peripherals, and other types of terminal devices, referred to herein as "nodes," that are connected together using shared cables and/or radio communication equipment. An example of a well-known network includes a local area network (LAN) that is typically confined to one general location. Wide area networks (WANs) are typically formed over many locations. Large networks, such as the Internet, have become popular for connecting millions of nodes together so that data and information can be shared.

The Open System Interconnection (OSI) Seven-Layer model defines how the architecture of a network is implemented. The Data Link Layer (or simply Link Layer) is the second layer of the OSI Seven-Layer model. A "segment," as defined herein, refers to a single link in the Data Link Layer in the overall network. Examples of segments include Ethernet switches, dialup links, T1 WAN links, etc. A single segment may be used to connect any number of nodes. For example, a segment may connect anywhere from a couple nodes up to thousands of nodes. Generally, there might be on the order of about 100 nodes connected together by a segment. On a point-to-point network segment, there are only two nodes at the two endpoints of the segment. On an Ethernet segment, however, there can be up to several thousand nodes since an Ethernet segment may consist of multiple Ethernet hubs, switches, and bridges.

Clustered groups of information or data, referred to herein as "frames," are transmitted across a segment. The source and destination on the segment are usually identified in the layer 2 (Data Link Layer) header. As an example, an Ethernet header contains the addresses of the source and destination of the frame on the Ethernet segment. Frames are routed between different segments by routers based on the destination address in the layer 3 (Network Layer) header. As a frame travels across a network via different segments, information contained within the layer 3 header of the frame is used to route the frame to its destination address. The layer 3 header, e.g., an Internet Protocol (IP) header, indicates the source and destination addresses in the overall network.

In order to perform an analysis of a particular segment of the network, a troubleshooter may utilize a network analyzer. Typical network analyzers decode the characteristics of frames, such as the transmission activity of the frames, through the particular segment under analysis. By passively monitoring the segment, the network analyzer retrieves frames off of the segment. The frames are stored into a frame capture buffer. The frames are then parsed to generate what is known in the art as "decode information," which includes details (in human-readable form) of the characteristics of each frame travelling through the segment and the movement of the frames from one node to another.

FIG. 1 illustrates a conventional graphical user interface (GUI) 10 showing the decode information that is displayed by a network analyzer. The decode information includes information about the transmission of frames through the segment under analysis. Other characteristics of the frames are also displayed as well including source and destination addresses, the protocol layers within the frame, and relevant information within each protocol layer. Generally, the GUI 10 may include an area divided up into three panes 12, 14, 16, whereby each pane shows the decode information in a particular form. The three panes 12, 14, 16 include, for example, a summary display view 18, a detailed display view 20, and a hexadecimal (hex) display view 22. As can be seen near the top of the GUI 10, one or more of the summary display view 18, detailed display view 20, and hex display view 22 may be selected for display, as indicated by check marks in each of the boxes 24 next to the different display views available. In this example, all three display views have been selected.

The summary display view 18 includes "records," whereby each record represents one frame. In this example, record numbers 66 through 74 are visible. Each record includes the transmission activity and characteristics of the respective frame. A troubleshooter may view the other records by scrolling up and down the list of records using a well-known vertical scrolling mechanism 25. Each record of the decode information includes the length of the frame (under the heading "Length"), the actual time that the frame transmission was completed (under the heading "Time"), the delta time or difference in time between completion of two subsequent frame transmissions (under the heading "Delta Time"), the frame's source address (under the heading "Src. Address"), destination address (under the heading "Dest. Address"), protocol (under the heading "Protocol"), etc. The summary display view 18 may also be scrolled horizontally using a well-known horizontal scrolling mechanism 26 to view additional decode information not visible within the limited dimensions of pane 12.

From the summary display view 18, a troubleshooter may select a record, as indicated by reference numeral 27, from the list of viewable records to see the detailed information and hexadecimal information of the selected record 27 in the other two panes 14, 16. In this example, the selected record 27 is record number 66. As can be seen in the second and third panes 14, 16 (the detailed display view 20 and hex display view 22, respectively), the selected record number 66 is displayed in a detailed form and a hexadecimal form.

From the information seen on the GUI 10, a troubleshooter may be able to ascertain problems with the analyzed segment of the network. Normally when trying to isolate a problem, a troubleshooter will start at a statistical view, such as a connection statistics view. The troubleshooter may be interested in a number of different attributes, such as, for example, the frames transmitted between two nodes. In another example (not shown in FIG. 1), the statistical view may show that there are 5 frames transmitted from node A to node B and 7 frames transmitted from node B to node A. From this statistical view, if the troubleshooter needs to see the details of the conversation between the two nodes, he would select the connection and "drill and filter" to a decode measurement. The "drill and filter" operation brings up a decode view, which may include the summary display view, showing only the frames that match the source and destination of the connection. By selecting a connection between nodes A and B and executing a drill and filter operation, the troubleshooter is able to bring up the decode view showing only those frames transmitted from node A to node B or from node B to node A.

The drill and filter operation allows a troubleshooter to filter from millions of frames down to just the frames involved in a particular connection. The troubleshooter may also drill and filter according to attributes other than the transmission activity between two nodes. It should be noted, however, that the conventional GUI 10 of FIG. 1 shows the decode information in its raw textual form as detected by the network analyzer, providing all the details of the decode information.

One downside to the conventional network analyzer and the respective display 10 generated therefrom is that the network analyzer may capture about one million frames (or records) from a network segment during a given time interval. Even filtering down to a specific connection may still result in thousands of frames. Therefore, to view the large number of records and detect problems with the network segment, a troubleshooter may be required to sort through an overwhelming amount of information. Furthermore, the textual display of timestamps in the GUI 10 is not easily interpreted. Network transactions involving several nodes may be hard to follow by looking at source and destination addresses. Up until now, the troubleshooter's task has been very tedious and time-consuming. Thus, a need exists in the industry to address the aforementioned deficiencies and inadequacies.

SUMMARY

Disclosed herein are embodiments of systems and methods for troubleshooting and analyzing the performance of a network or a segment of a network. To obtain frame decode information from a segment, a network analyzer may be used. An embodiment of a network analyzer described herein comprises a frame monitoring device, a frame capture buffer, a frame decoder, a decode information buffer, and a display generating system. The frame monitoring device is configured to monitor frames on the segment under analysis. The frame capture buffer is configured to store the frames. The frame decoder is configured to decode frames from the frame capture buffer, generating decode information for each frame. The display generating system is configured to create a graphical display view from a portion of the decode information.

Other systems, methods, features, and/or advantages of the present disclosure will be apparent to one having skill in the art upon examination of the following drawings and detailed description. It is intended that all such additional systems, methods, features, and/or advantages be included within this description and protected by the accompanying claims.

BRIEF DESCRIPTION OF THE DRAWINGS

Many aspects of the embodiments disclosed herein can be better understood with reference to the following drawings. The components in the drawings are not necessarily to scale, emphasis instead being placed upon clearly illustrating the principles of the present disclosure. Like reference numerals designate corresponding parts throughout the several views.

DETAILED DESCRIPTION

Network analyzing systems and methods, such as network troubleshooting systems, logic analyzers, and the like, are described herein for analyzing one or more segments, computer busses (SCSI, PCI, etc.), communication links, etc. of a data communications network. The network analyzing systems defined herein include detection circuitry for capturing decode information. As mentioned earlier, the decode information refers to information concerning the characteristics of frames travelling through the segment under analysis and the transmission activity of the frames. In contrast to the conventional network analyzers, the network analyzing systems defined herein manipulate the decode information to extract characteristics of the frames. The network analyzing systems create diagrammatic views, such as a graphical display view that conveys the characteristics of the frames in a manner that is easier for a troubleshooter to analyze. The decode information can be charted into a diagrammatic or graphical form that displays the transmission activity of frames on individual nodes. Thus, in some embodiments, a troubleshooter can more easily and more quickly obtain useful characteristics of the frame transmission activity through the analyzed segment.

Figure 1:
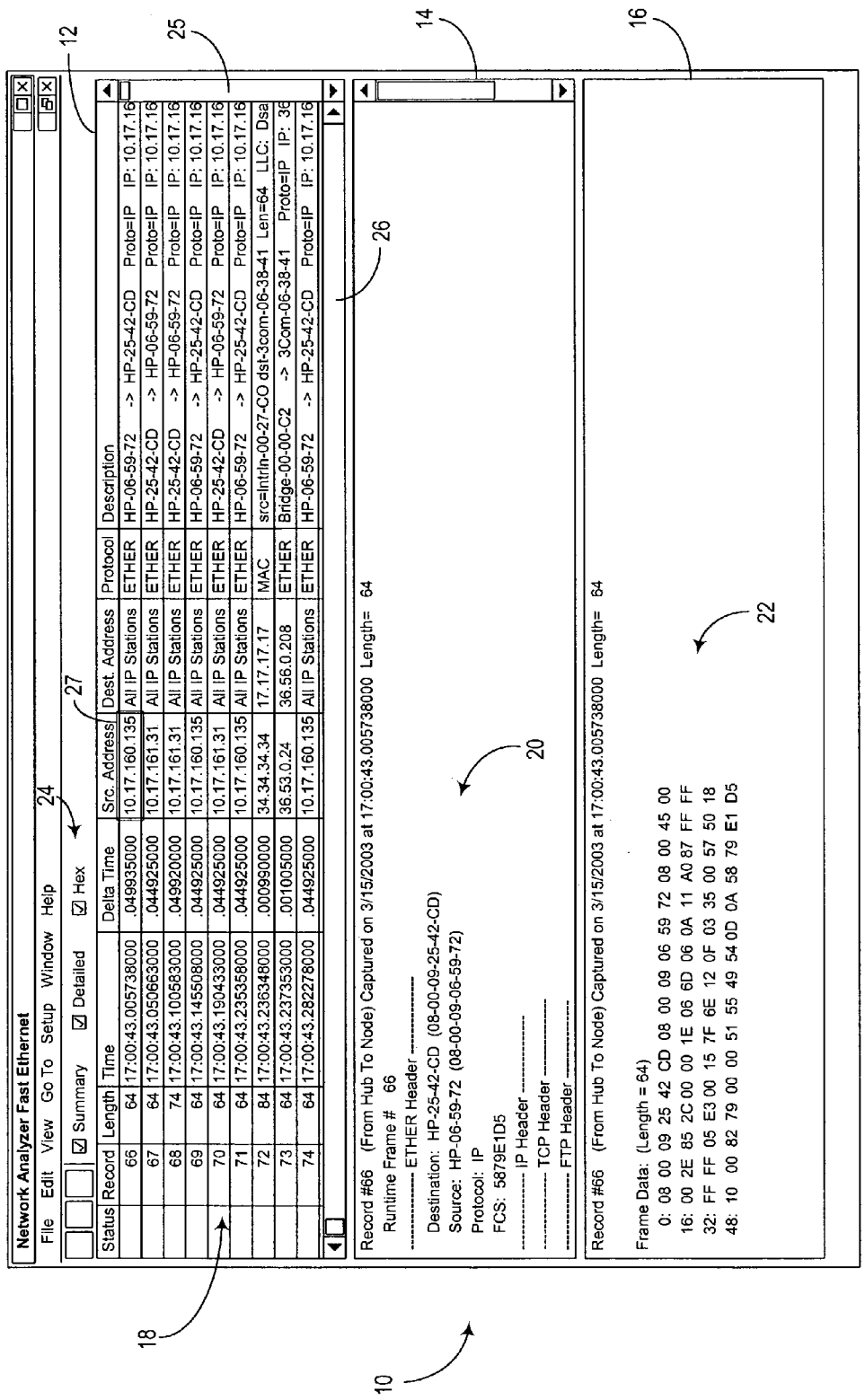
FIG. 1 is a view of a conventional graphical user interface showing the raw textual form of decode information received from a network analyzer.
Figure 2:
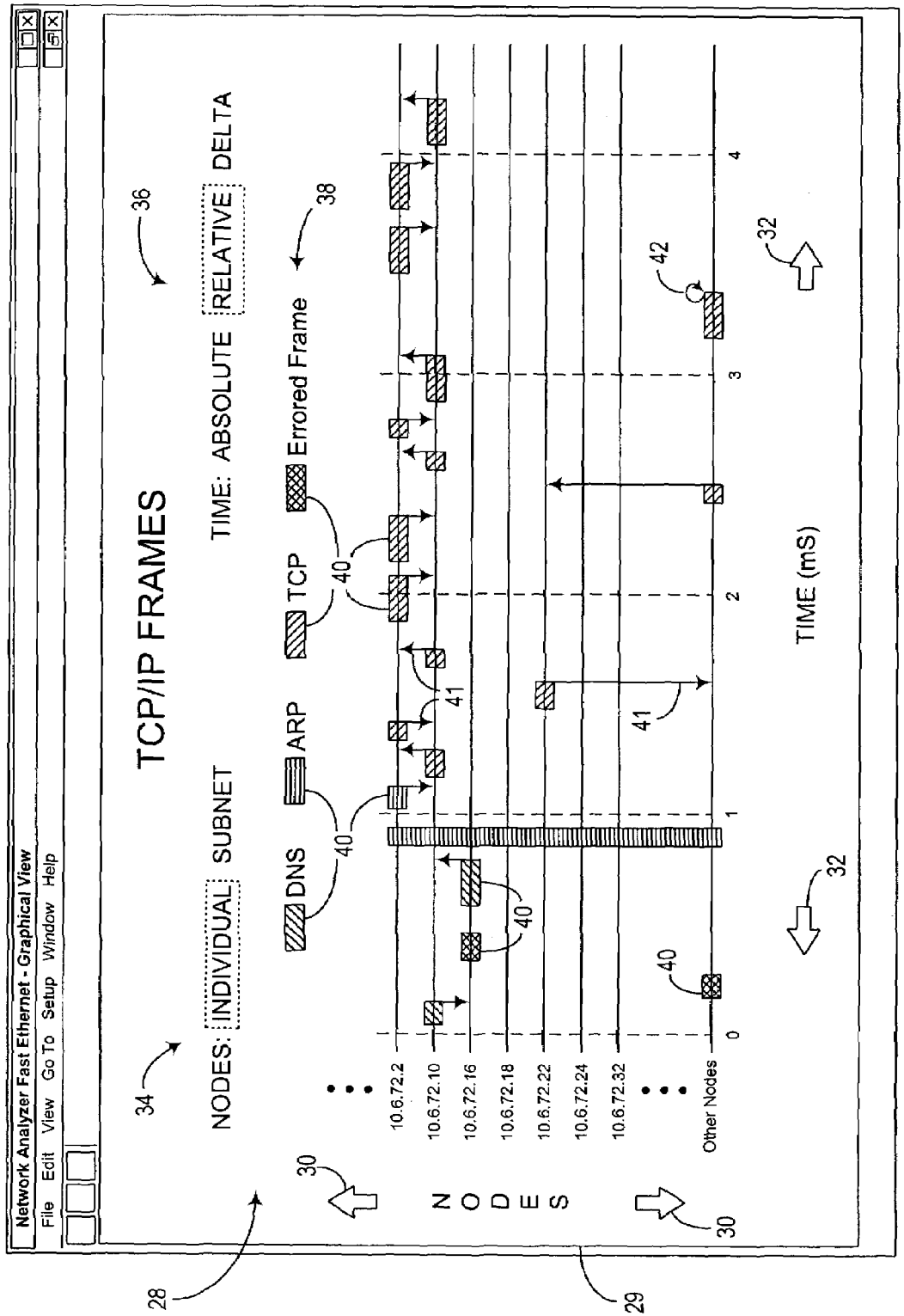
FIG. 2 illustrates an embodiment of a graphical user interface showing a graphical display view of decode information.

FIG. 2 illustrates an embodiment of a graphical user interface (GUI) including a graphical display view 28 within pane 29 that presents the decode information in diagrammatic or graphical form. Instead of displaying only raw decode information, as is done in the prior art, the network analyzing systems disclosed herein process the decode information in such a way that the frame transmission activity on individual nodes is displayed. It should be noted, however, that the graphical display view 28 showing the TCP/IP frames is merely an example of one type of frame address that may be displayed. Other types of frame addresses may be displayed as well, such as layer 2, layer 3, or even higher layer addresses.

The graphical display view 28 includes a graph in which the nodes are labeled on the y-axis and are depicted by solid horizontal lines. The nodes are identified by their addresses, e.g. Internet addresses 10.6.72.2; 10.6.72.10; 10.6.72.16; etc. Alternatively, the nodes may be identified by their host names, such as "www.agilent.com," for example. Time is shown on the x-axis of the graph and may be shown in milli-seconds (mS) or other suitable units.

In the graphical display view 28 of FIG. 2, the node labeled "Other Nodes" refers to all of the remaining nodes whose addresses are not specifically labeled in the visible portion of the view. Although only seven nodes are specifically labeled, any number of nodes may be displayed at one time. The number of specifically-labeled nodes may depend on the size and/or space capabilities of the graphical user interface (GUI) being used, pre-selected user preferences, or other factors. "Other Nodes" may be configured in a tree structure that can be expanded to reveal the other nodes.

The graphical display view 28 includes arrows 30 located next to the nodes. The arrows 30 represent an embodiment of a node scrolling device in which one of the arrows may be pressed or selected to scroll through the nodes upward or downward through the list of nodes. A user may press or select an arrow 30 using known techniques such as computer mouse movements and clicks, keyboard strokes, touch screen selections, or other suitable selection devices. Alternatively, the GUI may include other mechanisms that allow a troubleshooter to scroll through the nodes to see particular nodes of interest. To remove nodes from the labeled section of the nodes, a click and drag mechanism may be used to place a labeled node into the "Other Nodes" section, thereby decluttering the display from unneeded or inactive nodes.

In a similar manner, the graph may be scrolled along the time axis using arrows 32 near the bottom of the graphical display view 28. If a troubleshooter wishes to observe the graphical display view 28 at a different time interval, the troubleshooter may change the view by selecting the appropriate arrow buttons 32 using any suitable selection devices. Other node and time scrolling devices may be used to allow the troubleshooter to scroll upward and downward through the list of nodes and forward and backward in time on the time axis. For instance, alternative scrolling devices may include a vertical scrolling device and a horizontal scrolling device on the GUI.

Since all of the frames may not be viewable on one display view, the entire view of all the frames may be stored in a buffer. In this manner, any portion of the entire view may be easily accessed from the buffer by different scrolling devices. By using a buffer, the act of scrolling would not require the immediate processing of data to be newly displayed. Instead, the new view must only be retrieved from the buffer. In this sense, the graphical display view 28 is more responsive to control signals and can be readily retrieved when scrolling is activated. Also, the buffer may allow the user to scroll back and forth without the need for a processor to re-process the same portion of data more than once.

Another control mechanism that may be available to the user is a node format selecting device 34, as shown in FIG. 2. The node format "NODES:" is indicated near the top of the display as either "INDIVIDUAL" or "SUBNET." In this example display, the node format is selected such that the "individual" nodes are viewed. Alternatively, by selecting "SUBNET," the nodes are shown in which they are grouped into subnets, in which related nodes are grouped together. Instead of individual node addresses being labeled on the left hand side of the display, the label for the grouped nodes may include a subnet designation such as "10.6.0.0/16" which denotes all nodes whose most significant 16 bits match "10.6". From the display of grouped nodes, the troubleshooter can view a higher-level display of the nodes to more easily identify a general area of concern, such as an area where frame activity might be more intense. In the subnet mode, each subnet could be expanded (similar to a tree control) to show all nodes within the subnet. This would be accomplished by clicking on a "+" indicator at the left of the subnet label.

Likewise, the time axis may also be altered using a time format selecting device 36, as also indicated near the top of the display in FIG. 2. The time format "TIME:" may be selected from choices such as "ABSOLUTE," "RELATIVE," and "DELTA." The time format illustrated in FIG. 2 shows the "relative" time selected in which a time such as zero (0) mS is presented as a reference. By selecting one of the time formats available, the user may view the time axis in a desired fashion. With "ABSOLUTE" time selected, the actual time in hours, minutes, and seconds is displayed representing the time when the transmission of the frame has completed. With "DELTA" time selected, the difference in time between two subsequent frames is displayed.

The graphical display view 28 further includes a legend 38 for illustrating to the troubleshooter how the different protocols can be identified. For instance, the example protocols may include domain name system (DNS), address resolution protocol (ARP), transmission control protocol (TCP), etc. Also, if a frame is detected as having an error or fault, an "Errored Frame" may be identified as well. The legend 38 indicates that a frame having a particular protocol is indicated on the display as a block 40 with a distinctive shading, bordering, cross-hatching, and/or coloring scheme that is unique to the particular protocol. The coloring scheme may include the use of different colors other than black and white. Any suitable distinctive marking scheme may be used to identify the different protocols.

In addition to the frame protocol identifying scheme, the legend 38 may also include a marking scheme for identifying flags (not shown) that are transmitted through the analyzed segment of the network. Such flags may include transmission control protocol (TCP) flags, for example, as defined according to the "RFC 793" specifications, published by the Internet Engineering Task Force (IETF). The TCP includes six flags that are represented by six control bits. The six flags include an urgent pointer field significant (URG) flag, an acknowledgement field significant (ACK) flag, a push function (PSH) flag, a connection reset (RST) flag, a sequence number synchronization (SYN) flag, and a finished, no more data from sender (FIN) flags. The flags are identified in the legend 38 by distinctive shades, borders, cross-hatching, and/or colors according to a predetermined marking scheme within blocks 40. In addition, attributes, other than the protocol of the frames and flags, may be defined by the shading, bordering, cross-hatching, and/or coloring scheme in the legend 38.

The length of the frames is illustrated in the graphical display view 28 by the width of the blocks 40 on the nodes. By observing the width with respect to the time axis, a troubleshooter is able to easily determine the general length of the frame. Also, a troubleshooter can also identify possible delay faults and/or latency. On the graphical display view 28, arrows 41 are shown at the end of the blocks 40, representing the source node that transmits the frame and the destination node that receives it. Arrow 42 represents a situation where a frame is transmitted strictly between nodes in the "Other Nodes" section.

In an alternative embodiment, the graphical display view 28 may be configured such that it displays a plurality of segments at a time. When multiple segments are analyzed at the same time, the frames of the segments are displayed in multiple node/time graphs similar to the one shown in FIG. 2. The respective node/time graphs are arranged vertically and share the same horizontal time axis. By selecting a frame on one segment, the same frame may be highlighted on the other segment graphs. An advantage of such a display is that latency can be computed.

Figure 3A:
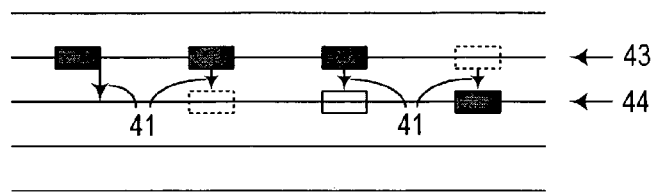
FIGS. 3A-3C illustrate embodiments of graphical elements representing frame transmission activity from a source node to destination nodes.
Figure 3B:
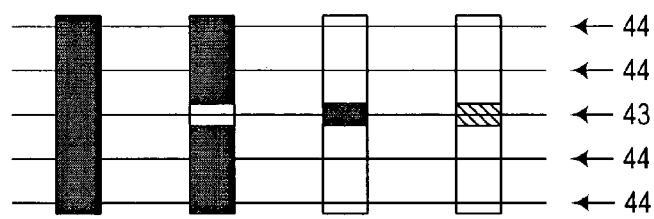
Figure 3C:
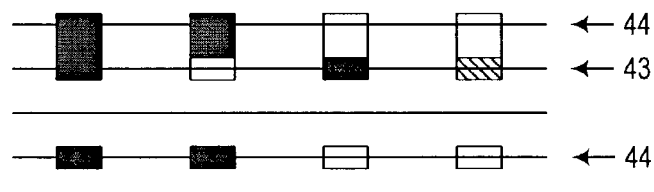

FIGS. 3A through 3C illustrate various alternative ways in which the movement of frames may be depicted in the graphical display view 28. For example, in FIG. 3A, the transmission of a frame from one node to another may be depicted by the arrows 41 to convey the concept of frame movement. The configurations may be shown such that the frame starts at a source node 43 where the tail of the arrow 41 is located and is transmitted to a destination node 44 where the head of the arrow 41 is located. Other graphical designs, other than the four designs shown, may be used to indicate the direction of frame travel.

FIG. 3B illustrates embodiments of graphical designs representing frames that are broadcast from a source node 43 to all destination nodes 44. The graphical designs showing the broadcast frames may identify the source node 43 with a different shaping, cross-hatching, and/or coloring scheme from the destination nodes 44. Again, the coloring scheme may include colors other than black and white. Other suitable illustrations may be used to depict a frame that is broadcast to all the other nodes.

FIG. 3C illustrates embodiments of graphical designs representing frames that are multicast from a source node 43 to a group of destination nodes 44. The graphical designs showing multicast frames may show the source node 43 having a distinctive visual scheme from the designated destination nodes 44. These or other suitable designs may be used to graphically illustrate a multicast frame transmitted from one node to a selected set of destination nodes.

Figure 4:
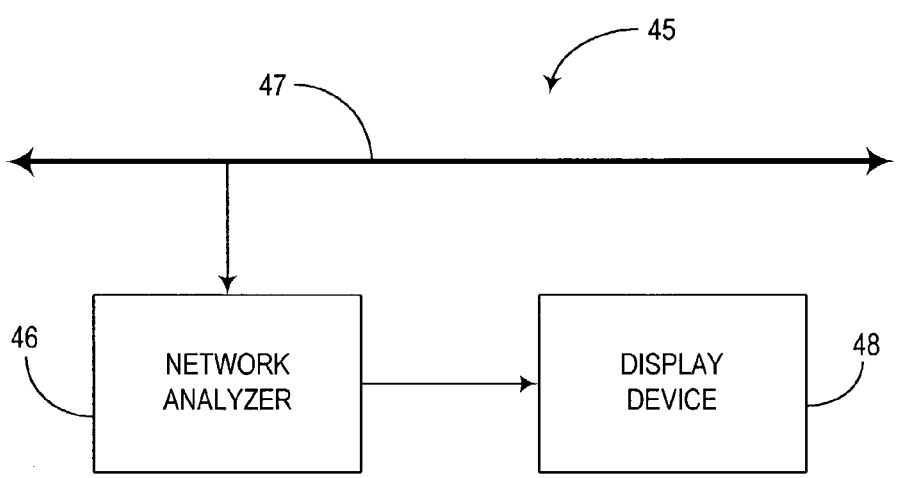
FIG. 4 is a block diagram of an embodiment of a troubleshooting system.

FIG. 4 is a block diagram of an embodiment of a general network analyzing system 45 that is used to provide a diagrammatic view, e.g., the graphical display view 28 shown in FIG. 2. The network analyzing system 45 analyzes the performance of a network and may have other useful applications, such as for statistical analysis, network troubleshooting, etc. The network analyzing system 45 includes a network analyzer 46 connected to a network 47. The network analyzer 46 may be connected to any segment of the network 47 to analyze the segment by obtaining decode information during a certain time interval. The network analyzer 46 includes a buffer to store the captured decode information. Using the stored information, the network analyzer 46 converts the raw data of the decode information into a diagrammatic view that is sent to a display device 48. The display device 48 visually displays the diagrammatic view. In one embodiment, the diagrammatic view does not show the conventional summary display view 18, detailed display view 20, or hex display view 22, but instead shows the graphical display view 28. In another embodiment, the diagrammatic display shows the graphical display view 28 along with one or more of the three conventional display views 18, 20, 22. The display-device 48 may be configured as a cathode ray tube (CRT) type display, such as a computer monitor, or alternatively may be, or may be connected to, a printing device that produces a hard-copy printout of the views.

Figure 5:
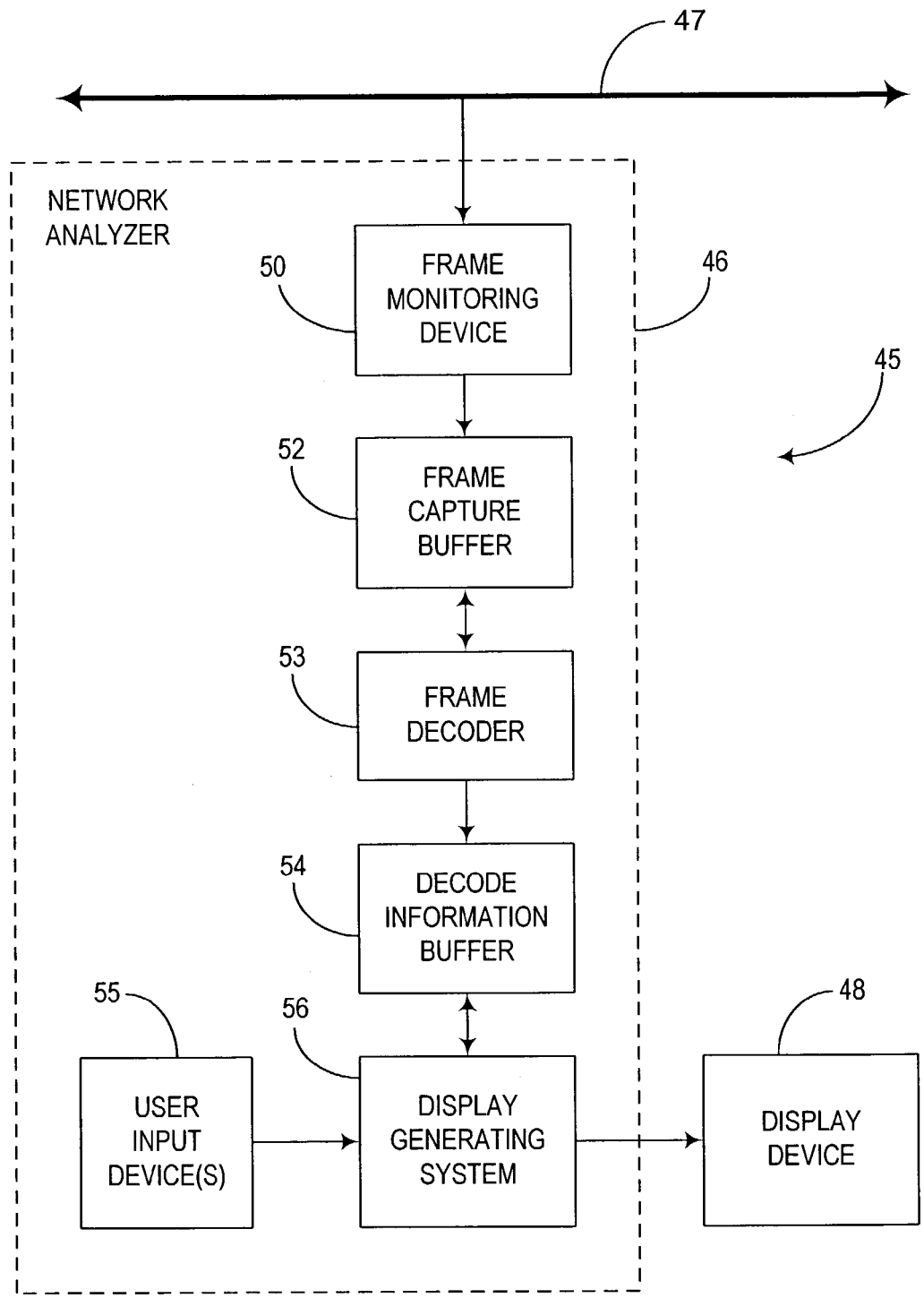
FIG. 5 is a block diagram of another embodiment of a troubleshooting system.

FIG. 5 is a block diagram of an embodiment of a network analyzing system 45 in which an embodiment of a network analyzer 46 is shown in greater detail than the network analyzer shown in FIG. 4. The network analyzer 46 in this embodiment includes a frame monitoring device 50, a frame capture buffer 52, a frame decoder 53, a decode information buffer 54, user input device(s) 55, and a display generating system 56. In an alternative embodiment, the user input device(s) 55 are separate from the network analyzer 46 and are used as external input devices.

The frame monitoring device 50 connects to the network 47 to passively monitor the frames from a segment under analysis. The monitored frames are transmitted to the frame capture buffer 52, which includes memory or storage media capable of storing a large number of frames. The frame decoder 53 takes frames from the frame capture buffer 52 and generates decode information for each frame. The decode information is forwarded to the decode information buffer 54 where the decode information may be accessed by the display generating system 56.

The display generating system 56 retrieves the decode information from the decode information buffer 54 and processes the information. The display generating system 56 may process the information such that several display views of the decode information are available upon demand and can be displayed. For example, in addition to the conventional summary display view 18, detailed display view 20, and hex display view 22, the display generating system 56 also processes the decode information to create at least one diagrammatic view, one of which may be the graphical display view 28 shown in FIG. 2. In another alternative embodiment, the display generating system 56 creates only diagrammatic views without the conventional views.

The display generating system 56 may include individual buffers for storing individual views of the summary information, detailed information, hex information, and graphical information. In this case, if the decode information buffer 54 is determined to be unnecessary, it may be removed. If the decode information buffer 54 is removed, the captured frames from the frame capture buffer 52 are immediately processed by the frame decoder 53 and stored into the individual buffers of the display generating system 56.

The display generating system 56 receives control signals from the user input device(s) 55, which, as mentioned above, may be internal or external to the network analyzer 46. The user input device(s) 55 may include one or more of keypads, keyboards, computer mice, touch screen devices, pen-light selection devices, or other suitable input devices. Using such devices, the user can control how the view or views are displayed on the display device 48. In one embodiment, the display generating system 56 may include a processor for determining a default view that is originally displayed on the display device 48. This default view, for example, may be a diagrammatic display view showing a portion of the most active nodes during a most active time interval. From the default view, a user may add views, control the views, etc. to see desirable portions and formats' of the decode information.

The display generating system 56 may also be configured to "filter out" some nodes from the display. Alternatively, this filtering could be done by a display filter device located at the input to the display generating system 56. A node filtering process could either be manually configured by the user, or could be automated by performing a context sensitive "drill and filter" operation from another view in the analyzer. For example the analyzer may have a "connection statistics" view that shows statistical information for pairs of nodes. Selecting a pair of nodes and performing a "drill and filter" operation would automatically configure the display generation system to only display that pair of nodes. Automated filtering by other criteria such as addresses, protocols, and other arbitrary combinations of attributes could be done in a similar manner.

Embodiments of the network analyzer 46 can be implemented in hardware, software, firmware, or a combination thereof. In the disclosed embodiments, the network analyzer 46 can be implemented in software or firmware that is stored in a memory and that is executed by a suitable instruction execution system. If implemented in hardware, as in an alternative embodiment, the network analyzer 46 can be implemented with any or a combination of the following technologies: a discrete logic circuit having logic gates for implementing logic functions upon data signals, an application specific integrated circuit (ASIC) having appropriate combinational logic gates, a programmable gate array (PGA), a field programmable gate array (FPGA), etc.

Figure 6:
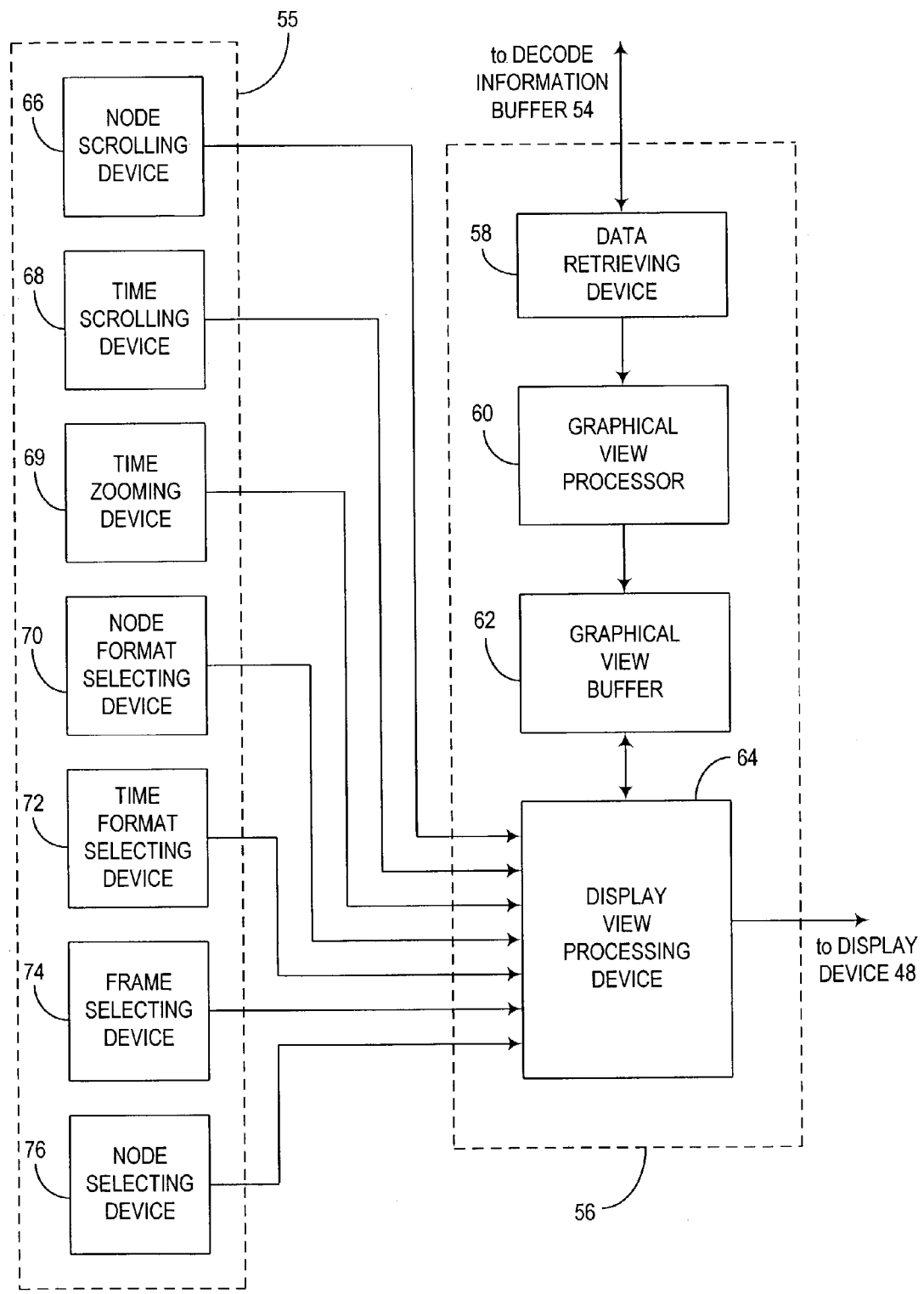
FIG. 6 is a block diagram of an embodiment of a display generating system receiving control signals from a number of user input devices.

FIG. 6 is a block diagram of a first embodiment of a display generating system 56 that receives control signals from a number of user input devices 55. The display generating system 56 of this embodiment may be incorporated into a network analyzer such as the one shown in FIG. 5. This embodiment illustrates a display generating system 56 that only processes diagrammatic or graphical views to be displayed on the display device 48. FIG. 6 also includes a number of examples of user input devices 55 that may be used with this embodiment for controlling the diagrammatic or graphical views.

The display generating system 56 includes a data retrieving device 58, a graphical view processor 60, a graphical view buffer 62, and a display view processing device 64. The data retrieving device 58 obtains the decode information from the decode information buffer 54 and feeds the decode information to the graphical view processor 60. The data retrieving device 58 retrieves the decode information from the decode information buffer 54 at an appropriate rate depending on the speed capabilities of the graphical view processor 60. If the decode information buffer 54 is removed as mentioned above, then the data retrieving device 58 obtains the decode information directly from the frame decoder 53. Alternatively, the data retrieving device 58 may retrieve its data from a file of captured frames stored externally on a storage mechanism outside the network analyzing system 45.

The graphical view processor 60 manipulates the decode information to extract transmission activity of the frames and other characteristics of the frames. The graphical view processor 60 processes the extracted characteristics to create a view of the decode information in a diagrammatic or graphical form. The graphical view processor 60 sends the graphical view to the graphical view buffer 62, which contains storage media for storing the graphical view. The graphical view is generally too large to display on the display device 48 all at once because of space limitations on the display device 48. Therefore, the entire graphical view is stored in the graphical user buffer 62 and a portion of the entire graphical view can be retrieved for displaying on the display device 48.

The display view processing device 64 accesses a portion of the graphical view from the graphical view buffer 62. The accessed portion is transmitted to the display device 48 for display. The display view processing device 64 receives control signals from any of the user input device(s) 55. The control signals dictate how the graphical view is displayed and which portions of the graphical view are displayed. For example, scrolling and selecting control signals may be received for scrolling the graphical view in a desired direction or for selecting particular frames or nodes.

In an alternative embodiment, the display view processing device 64 is configured to operate in a real-time mode. In the real-time mode, the graphical view from the graphical view processor 60 bypasses the graphical view buffer 62 and is entered directly into the display view processing device 64. The display view processing device 64 automatically scrolls along the time axis to display frames as they are received on the network.

The user input device(s) 55 may include, for example, a node scrolling device 66, a time scrolling device 68, a time zooming device 69, a node format selecting device 70, a time format selecting device 72, a frame selecting device 74, and a node selecting device 76. The node scrolling device 66 and time scrolling device 68 are capable of scrolling upward or downward through the list of nodes and forward and backward in time through a range of time intervals. The node scrolling device 66 and time scrolling device 68 may include a mechanism for clicking and dragging over a range of nodes or times to highlight a specific range of interest. In addition, the user input devices 55 may include a time zooming device 69 for zooming in to a narrower time range or zooming out to a broader time range.

Referring back to FIG. 2, the graphical display view 28 is organized to show individual nodes, or subnets of nodes, and the frames transmitted between these nodes. Therefore, the graphical display view 28 shows an organization of the decode information that is different from the prior art network analyzers. The node scrolling device 66 and time scrolling device 68 may be used in conjunction with the arrows 30, 32 or may be configured as other types of vertical or horizontal scrolling devices. Thus, the troubleshooter may scroll through the list of nodes and to a different range of time intervals.

In FIG. 6, the node format selecting device 70 and the time format selecting device 72 include devices for selecting the format of the node and time on the respective axes. As illustrated in FIG. 2, the format selecting devices 34, 36 may include selecting the optional formats from the display on the graphical display view 28. For example, the node formats may include the nodes along one axis displayed either individually or grouped. The time formats may include time displayed on the other axis in a format such as absolute time, relative time, or delta time.

The user input devices 55 may additionally include the frame selecting device 74 and the node selecting device 76. With reference again to FIG. 2, the frame selecting device 74 may include any number of mechanisms for selecting a particular frame. For example, a frame may be selected by a mouse click on a particular frame illustrated on the graph shown in FIG. 2. Alternatively, the frame may be selected by entering information of a particular node and a particular time using an input device such as a keyboard. Likewise, the node selecting device 76 may include a mechanism for selecting a particular node. For example, a mouse click or a keyboard entry of a node address may be used to select a node. The frame selecting device 74 and node selecting device 76 can be realized using other suitable devices for selecting frames and nodes.

Referring again to FIG. 6, the user input devices 55 provide control signals to the display view processing device 64. In response to the particular control signals, the display view processing device 64 accesses different portions of the graphical view, if necessary, from the graphical view buffer 62. The display view processing device 64 further contains processing units for establishing the form or design characteristics of a graph to be displayed. For example, the graph form may include horizontal lines for each respective node, as illustrated in FIG. 2, or may be shown in another desirable manner. For instance, the graph form may include a graphical view in which the node axis and the time axis are reversed from the graph form shown in FIG. 2. The display view processing device 64 also establishes and displays predefined "interaction areas" on the display device 48 where a user may interact. Interaction areas may be configured using linked buttons, arrows, words, characters, etc. that may be selected using a user input device 55.

Figure 7:
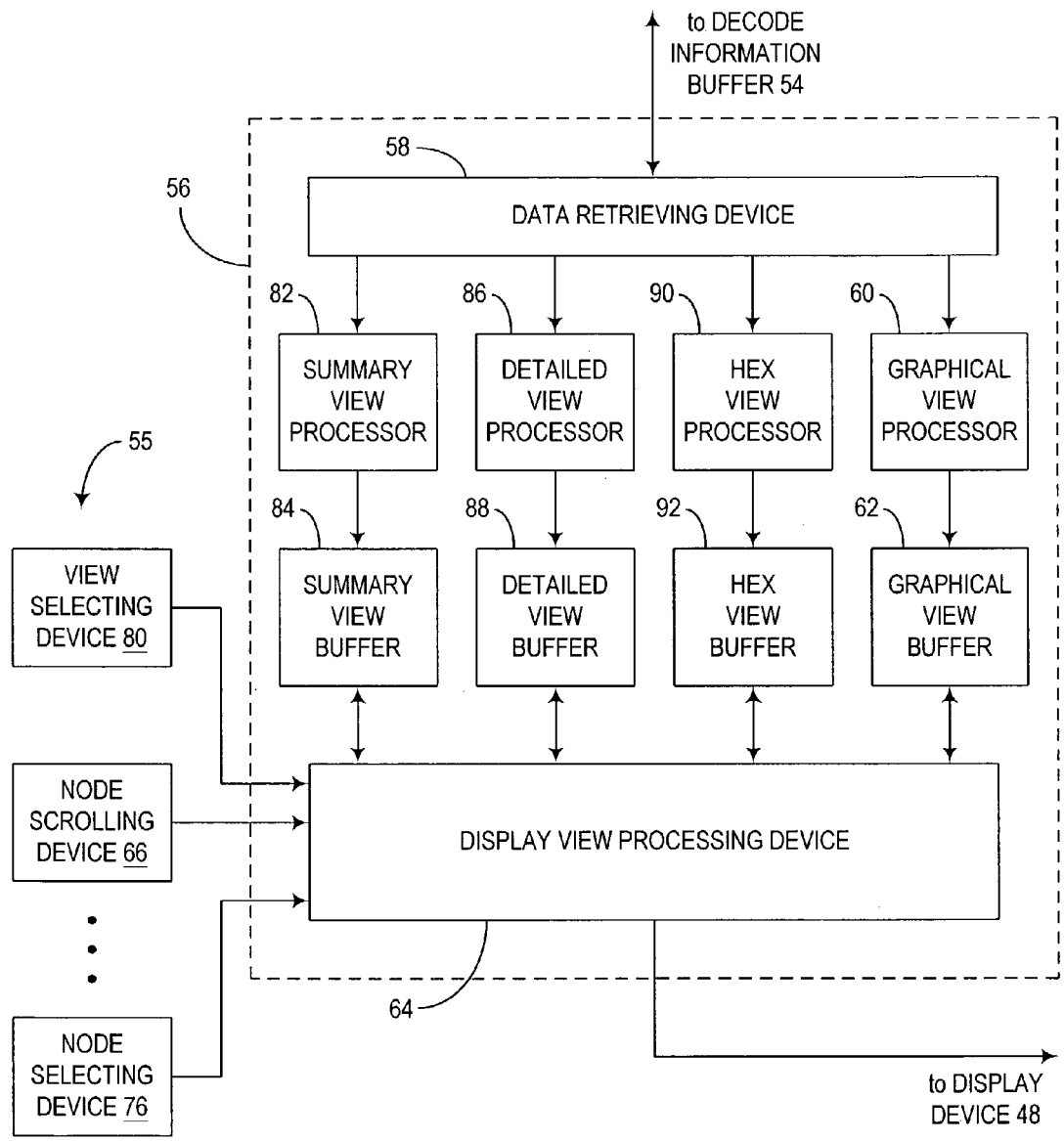
FIG. 7 is a block diagram of another embodiment of a display generating system receiving control signals from a number of user input devices.

FIG. 7 is a block diagram of a second embodiment of a display generating system 56 that receives control signals from user input devices 55. The display generating system 56 of this embodiment may be incorporated into a network analyzer such as the one shown in FIG. 5. This embodiment of the display generating system 56 includes a data retrieving device 58 and display view processing device 64 similar to the embodiment shown in FIG. 6. The display processing device 56 shown in FIG. 7 receives control signals from user input devices 55, such as the node scrolling device 66, time scrolling device 68, time zooming device 69, node format selecting device 70, time format selecting device 72, frame selecting device 74, and node selecting device 76, as shown in FIG. 6. In addition to these user input devices 55, the display processing device 56 also receives control signals from a view selecting device 80 configured to select one or more of the available views.

In the embodiment of FIG. 7, the display generating system 56 includes the graphical view processor 60 and graphical view buffer 62, as defined above with respect to FIG. 6, for providing diagrammatic or graphical views of the decode information. In addition, the display generating system 56 creates the conventional summary display view 18, detailed display view 20, and hex display view 22, and transmits these display views to the display device 48 for display. To create the conventional views, the display generating system 56 further includes a summary view processor 82, a detailed view processor 86, and a hex view processor 90. The summary view processor 82 processes the decode information to create a summary view that is stored on a summary view buffer 84. Likewise, the detailed view processor 86 processes the decode information to create a detailed view that is stored in a detailed view buffer 88. Furthermore, the hex view processor 90 processes the decode information to create a hex view that is stored in a hex view buffer 92.

In other alternative embodiments, the display generating system 56 may include the graphical view processor 60 and graphical view buffer 62 along with any one or more processor/buffer combinations for the other three views. For example, if only the graphical view and summary view are desired, an embodiment of the display generating system 56 may be configured that excludes the detailed view processor 86, detailed view buffer 88, hex view processor 90, and hex view buffer 92.

In the embodiment in which all four views are made available, as is shown in FIG. 7, the data retrieving device 58 retrieves the decode information from the decode information buffer 54 and supplies the decode information to each of the respective processors 82, 86, 90, 60. The data retrieving device 58 may be configured to supply the decode information to the processors 82, 86, 90, 60 according to the information that each processor requires in order to properly create the respective views. Since the display generating system 56 includes an individual buffer 84, 88, 92, 62 for each of the four views, respectively, the decode information buffer 54 may be removed to simplify the circuitry.

Once the decode information has been used to create the four different views, the display view processing device 64 accesses the views from individual buffers and creates a combined display that is sent to the display device 48. Based on control signals from the user input devices 55, the display view processing device 64 alters the display accordingly. One user input device 55 may include the view selecting device 80. The view selecting device 80 may include a device for receiving a user's input concerning which views are to be displayed. For example, the user may select any or all of the four views as desired.

It should be mentioned that the user input devices 55 do not necessarily affect all of the views. For instance, the time scrolling device 68 allows a user to scroll through and observe a particular time interval. The time scrolling device 68 would not affect the detailed view or the hex view since these views are only representative of one time instance. However, the time scrolling device 68 may be used to scroll up and down the records of the summary display view 18 to see different frames at the different times. Also, the time scrolling device 68 would affect the graphical view since the time dimension is graphically shown on the x-axis of the graphical display view 28 and would cause a horizontal shifting of the graphical view.

The frame selecting device 74 may be used in a similar manner to select one particular frame (or record). Since each frame is captured at a particular time, the frame selecting device 74 provides a pin-pointed view of a particular time. The frame selecting device 74 is most useful for the detailed view and hex view to select a particular frame or record for display, but this selection may also affect the summary display view 18 and graphical view. For example, the selected frame or record may be shown at the beginning or in the middle of the range of several time frames or records displayed by the respective views.

Figure 8:
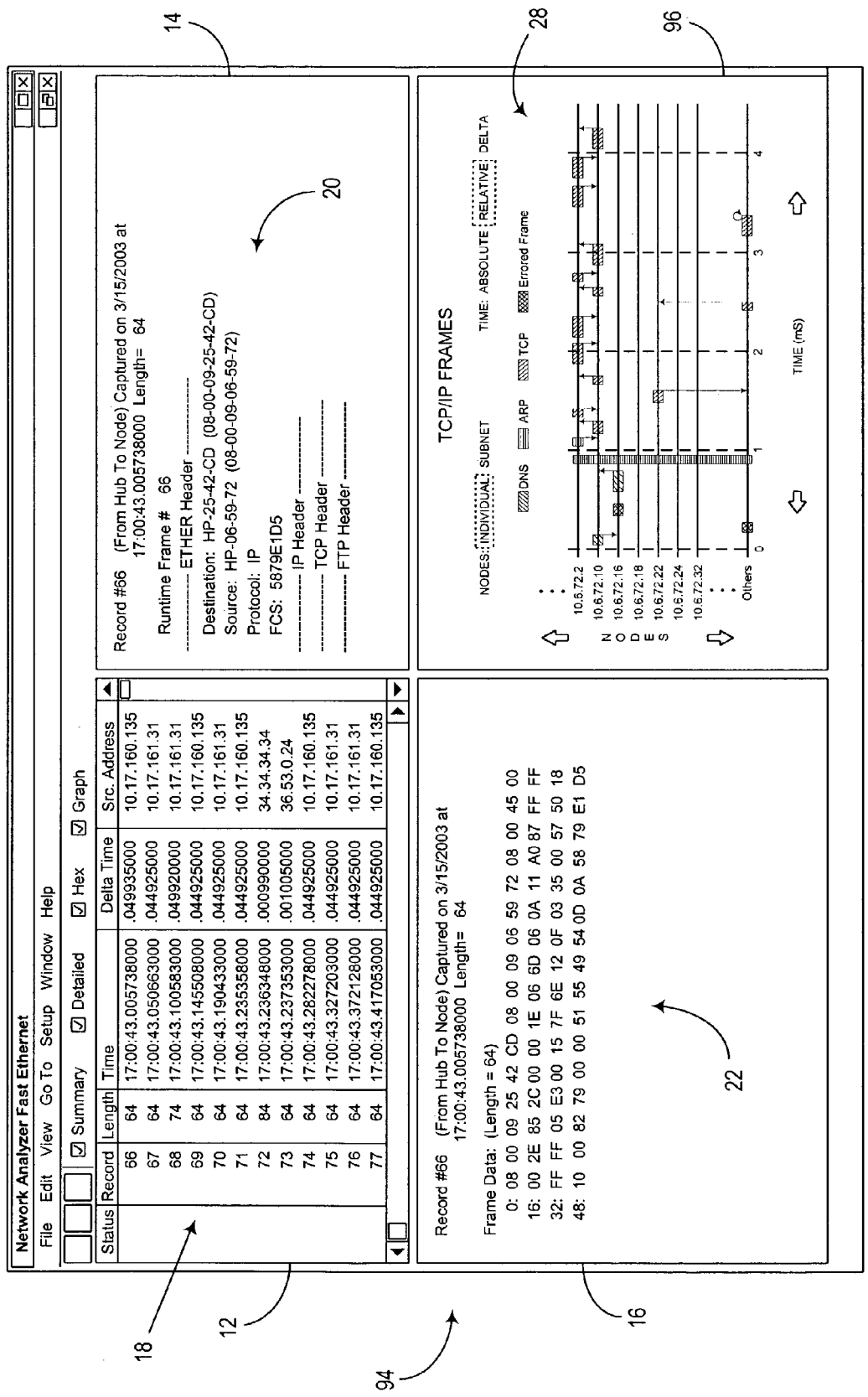
FIG. 8 illustrates an embodiment of a graphical user interface showing a diagrammatic display view of decode information.

FIG. 8 shows an embodiment of a GUI showing a diagrammatic display view 94 of the decode information. The diagrammatic display view 94 may be produced when all four display views have been selected. With all four views incorporated into the display, four panes may be opened to display one view per pane. When the display view processing device 64 provides more than four views, such as in the case where multiple graphical views are created, the diagrammatic display view 94 opens more than four panes.

Control may be asserted to all views simultaneously or asserted to individual views, depending on the control signals received. For example, since the summary view pane 12 is too small to show the entire view of the summary information, scrolling may be performed on this pane 12 alone to view different portions of the summary display view 18. The different panes of the display may be synchronized such that selecting a frame in either the summary display view 12 or the graphical display view 28 will result in that frame being selected and displayed in all other panes of the display (12, 14, 16, and 96). Other suitable automatically-controlled and/or user-defined display controlling criteria may be established.

Utilizing the various buffers as described in FIG. 7, the views can be updated or changed according to control signals from the user input devices 55. In addition to the three panes 12, 14, 16 of the conventional display 10, the diagrammatic display 94 of FIG. 8 allows a user to view the graphical display view 28, or other diagrammatic display view, in a fourth pane 96. With the diagrammatic display 94, a troubleshooter has access to a view, i.e. the graphical display view 28, that diagrammatically illustrates characteristics of the frames of the detailed decode information in a unique manner. This example as well as other conceivable configurations of displays may be viewed on the display device 48.

Figure 9:
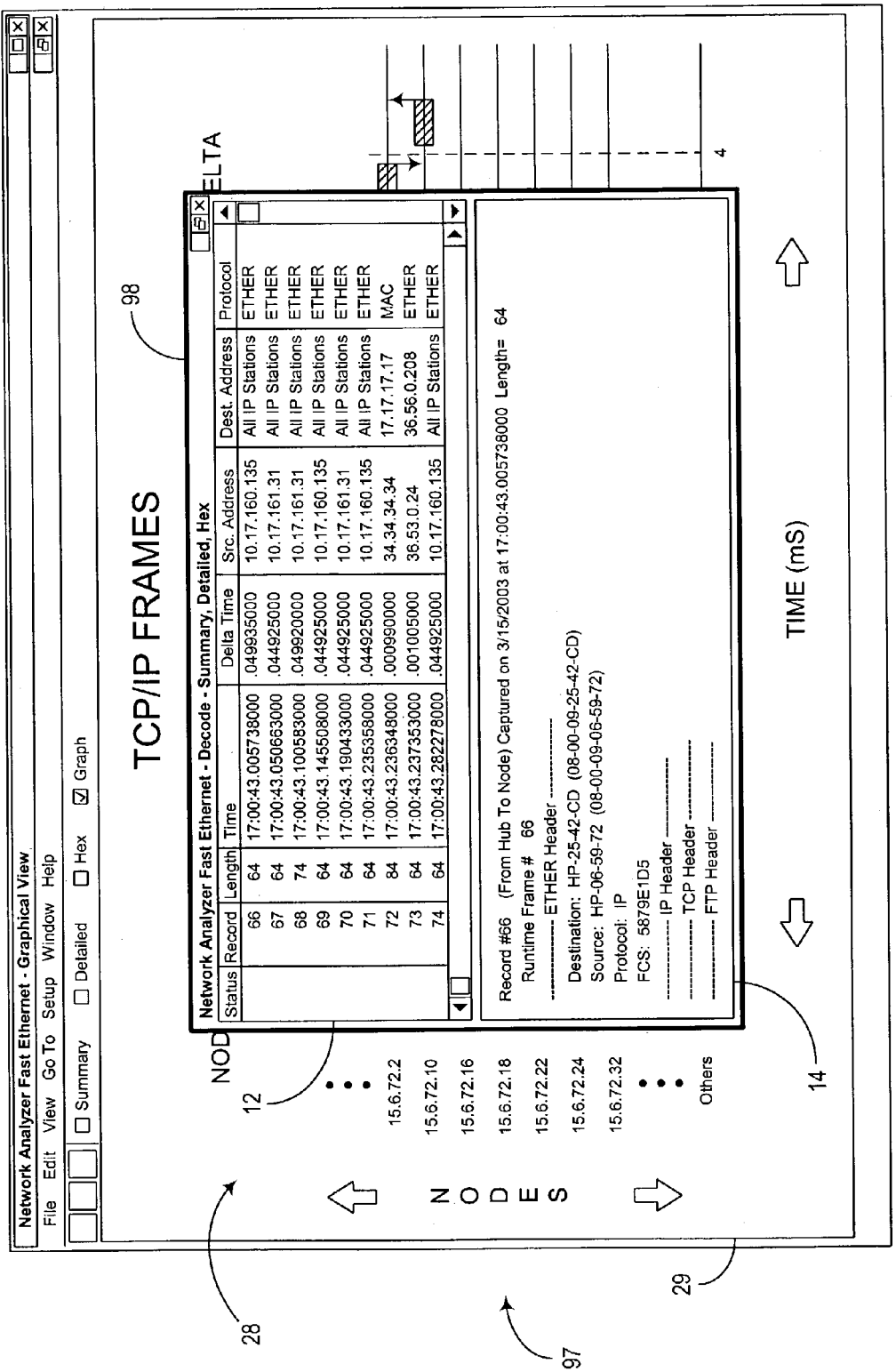
FIG. 9 illustrates another embodiment of a graphical user interface showing a diagrammatic display view of decode information.

FIG. 9 illustrates another embodiment of a GUI showing a diagrammatic display view 97 of the decode information. In this embodiment, the diagrammatic display view 97 shows the graphical display view 28 within pane 29 as shown in FIG. 2. Additionally, the diagrammatic display view 97 further illustrates a particular node, frame, and/or time that has been selected. A node or frame may be selected, for example, by clicking on the desired node or frame or by using another type of frame selecting device or node selecting device. In this embodiment, selecting a node, frame, or time creates a new window 98 that shows a different view of the decode information. For example, the new window 98 may be superimposed over the graphical display view 28. The new window 98 may contain one or more panes 12, 14, 16 showing the summary display view 18, the detailed display view 20, and/or the hex display view 22, respectively, depending on the item selected or depending on other predetermined criteria. The size and shape of the new window 98 may be manipulated by the user to enlarge, minimize, etc. When finished viewing this window 98, the troubleshooter may close the window 98 to see the graphical display view 28 again. In this embodiment, the graphical display view 28 is the default view and one or more of the summary display view 18, detailed display view 20, and/or hex display view 22 may become available upon selection of a particular node, frame, or time or based on other selections.

In addition to the embodiments shown in FIGS. 8 and 9, other diagrammatic views may be created and displayed. For example, the network analyzing system 45 may display an "expert" view that shows statistics such as the number of frames per second, number of bytes per second, percentage of utilization on the network, etc. The expert view may also display an analysis of traffic on the network and provide alerts, warnings, and normal indicators.

Figure 10:
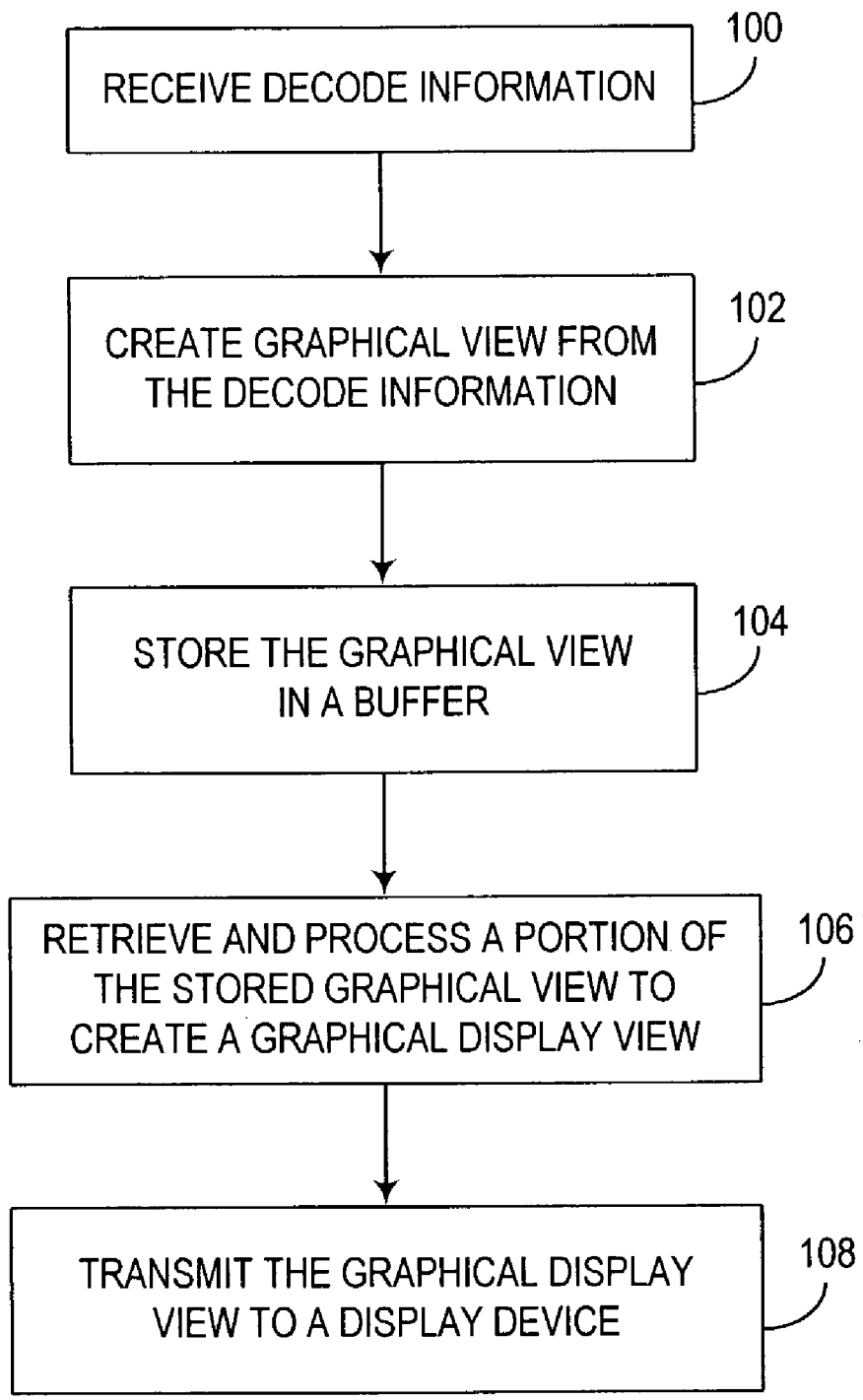
FIG. 10 is a flow chart of an embodiment of a network troubleshooting method.

FIG. 10 is a flow chart of an embodiment of a method for analyzing a network and graphically displaying decode information. In block 100, decode information from a network or network segment is received. The decode information is preferably detected by a network analyzer and is related to analysis data of a network segment. The received decode information may then be stored in a buffer. Alternatively, the decode information may be received by retrieving the information from a buffer that has already stored the decode information. In block 102, the decode information is used to create a graphical view. Creating the graphical view may further comprise processing or manipulating the decode information to extract characteristics of the network segment. The extracted characteristics are preferably related to transmission activity and/or characteristics of frames travelling through the network segment. This procedure may further include the manipulation of the decode information to further extract summary, detailed, and/or hex information for creating summary, detailed, and hex views.

In block 104, the entire created graphical view is stored in a buffer. In block 106, a portion of the graphical view that is stored in the buffer is retrieved. This portion is processed in order to create a graphical display view, which represents the portion of the entire graphical view that can be displayed on a graphical user interface. In block 108 the graphical display view is transmitted to a display device, where the graphical information may be displayed and viewed by a troubleshooter.

The flow chart of FIG. 10 shows the architecture, functionality, and operation of a possible implementation of the network troubleshooting software. In this regard, each block represents a module, segment, or portion of code, which comprises one or more executable instructions for implementing the specified logical function(s). It should also be noted that in some alternative implementations, the functions noted in the blocks may occur out of the order noted in FIG. 10. For example, two blocks shown in succession in FIG. 10 may in fact be executed substantially concurrently or the blocks may sometimes be executed in the reverse order, depending upon the functionality involved, as will be further clarified herein below.

The network troubleshooting program, which comprises an ordered listing of executable instructions for implementing logical functions, can be embodied in any computer-readable medium for use by an instruction execution system, apparatus, or device, such as a computer-based system, processor-controlled system, or other system that can fetch the instructions from the instruction execution system, apparatus, or device and execute the instructions. In the context of this document, a "computer-readable medium" can be any medium that can contain, store, communicate, propagate, or transport the program for use by the instruction execution system, apparatus, or device. The computer-readable medium can be, for example, an electronic, magnetic, optical, electromagnetic, infrared, or semiconductor system, apparatus, device, or propagation medium. More specific examples of the computer-readable medium include the following: an electrical connection having one or more wires, a portable magnetic computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, for instance, by optical scanning of the paper or other medium, then compiled, interpreted or otherwise processed in a suitable manner if necessary, and then stored in a computer memory. In addition, the scope of the present disclosure includes the functionality of the herein-disclosed embodiments configured with logic in hardware and/or software mediums.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:

1. A network analyzing system comprising a network analyzer and a display device, wherein the network analyzer comprises:
    a frame monitoring device in communication with a network, the frame monitoring device being operative to monitor frames transmitted through a segment of the network;
    a frame decoder in communication with the frame monitoring device, the frame decoder being operative to decode the frames to provide decode information, the decode information related to characteristics of the frames and transmission activity of the frames;
    a decode information buffer in communication with the frame decoder, the decode information buffer being operative to store the decode information; and
    a display generating system in communication with the decode information buffer, the display generating system being operative to generate a graphical display view that presents the decode information in a diagrammatic form, the diagrammatic form further comprising:
        a graph having a first axis and a second axis, the first axis having an identification of each individual node of at least a subset of a plurality of nodes within the segment of the network, the second axis representing time; and
        a graphical representation of each frame displayed in association with its respective node at a specific time;
        wherein each individual frame is represented by a separate block;
    wherein the display device is arranged in communication with the display generating system, the display device being operative to display the graphical display view of the decode information.

2. The network analyzing system of claim 1, wherein the display generating system comprises:
    a data retrieving device operative to retrieve decode information from the decode information buffer;
    a graphical view processor in communication with the data retrieving device, the graphical view processor being operative to process the decode information to create a graphical view of the decode information;

a graphical view buffer in communication with the graphical view processor, the graphical view buffer being operative to store the graphical view; and a display view processing device operative to access the graphical view from the graphical view buffer, create the graphical display view, and present the graphical display view to the display device according to control signals from at least one user input device.

3. The network analyzing system of claim 2, wherein the display generating system further comprises:

a summary view processor operative to process the decode information to create a summary view of the decode information;

a summary view buffer in communication with the summary view processor, the summary view buffer being operative to store the summary view;

a detailed view processor operative to process the decode information to create a detailed view of the decode information;

a detailed view buffer in communication with the detailed view processor, the detailed view buffer being operative to store the detailed view;

a hex view processor operative to process the decode information to create a hex view of the decode information; and a hex view buffer in communication with the hex view processor, the hex view buffer being operative to store the hex view.

4. The network analyzing system of claim 3, wherein the at least one user input device comprises a view selecting device operative to select at least one of the graphical display view, a summary display view, a detailed display view, and hex display view.

5. The network analyzing system of claim 3, wherein the display device is operative to display the views of the decode information in at least four panes.

6. The network analyzing system of claim 5, wherein at least one graphical view is show in at least one pane.

7. The network analyzing system of claim 3, wherein the display device is operative to show the graphical display view and at least one of a summary display view, detailed display view, and hex display view superimposed on the graphical display view.

8. The network analyzing system of claim 1, wherein the display generating system is further operative to receive control signals from at least one user input device.

9. The network analyzing system of claim 8, wherein the at least one user input device comprises a node scrolling device and a time scrolling device.

10. The network analyzing system of claim 9, wherein the at least one user input device further comprises a time zooming device, a node format selecting device, a time format selecting device, a frame selecting device, and a node selecting device.

11. The network analyzing system of claim 1, wherein the display device Is a printing device.

12. A display generating system comprising:

means for receiving decode information, the decode information related to characteristics of frames detected during an analysis of a segment of a network; and means for processing the decode information to create a graphical view of the decode information, the graphical view comprising:

a graph having a first axis and a second axis, the first axis having an identification of each individual node of at least a subset of a plurality of nodes within the segment of the network, the second axis representing time; and a graphical representation of each frame displayed in association with its respective node at a specific time; wherein each individual frame is represented by a separate block.

13. The display generating system of claim 12, further comprising:

means for storing the graphical view; and means for processing the graphical view according to control signals to present a portion of the graphical view to a display device.

14. The display generating system of claim 13, further comprising:

means for processing the decode information to create a summary view of the decode information;

means for processing the decode information to create a detailed view of the decode information;

means for processing the decode information to create a hex view of the decode information; and means for storing the summary view, detailed view, and hex view.

15. A method of analyzing a segment of a network, the method comprising:

receiving decode information related to transmission activity and characteristics of frames detected within a segment of a network;

creating a graphical view from the decode information;

processing the graphical view to create a graphical display view; and transmitting the graphical display view for display, the graphical display view comprising:

a graph having a first axis and a second axis, the first axis having an identification of each individual node of at least a subset of a plurality of nodes within the segment of the network, the second axis representing time; and a graphical representation of each frame displayed in association with its respective node at a specific time; wherein each individual frame is represented by a separate block.

16. The method of claim 15, wherein processing the graphical view further comprises:

storing the graphical view;

receiving control signals; and retrieving a portion of the graphical view based on the control signals.

17. A network analyzer comprising:

a frame decoder operative to decode characteristics and movement of frames traveling within a network segment, the frame decoder being further operative to provide decode information related to the characteristics and movement of the frames;

a display generating system operative to create a graphical display view from a portion of the decode information, the graphical display view comprising:

a graph having a first axis and a second axis, the first axis having an identification of each individual node of at least a subset of a plurality of nodes within the network segment, the second axis representing time; and a graphical representation of each frame displayed in association with its respective node at a specific time; wherein each individual frame is represented by a separate block; and a display unit for displaying the created graphical display view.

18. The network analyzer of claim 17, further comprising a frame monitoring device operative to detect the frames.

19. The network analyzer of claim 17, further comprising a decode information buffer operative to store the decode information.

20. The network analyzer of claim 17, wherein the display generating system comprises:
- a data retrieving device operative to retrieve the decode information from the decode information buffer;
- a graphical view processor operative to process the decode information to create a graphical view of the decode information;
- a graphical view buffer operative to store the graphical view; and
- a display view processing device operative to retrieve and process a portion of the graphical view to create the graphical display view.

21. The network analyzer of claim 20, wherein the display view processing device is further operative to transmit the graphical display view to a display device, the display device being operative to display the graphical display view.

22. The network analyzer of claim 17, each individual block having a width representing the transmission time of the respective frame from one node to another.

23. The network analyzer of claim 17, wherein the graphical display view further comprises a representation of the transmission of frames from one node to another.

24. The network analyzer of claim 21, wherein the graphical display view comprises a legend that identifies the protocol of the respective frames and flags.

25. The network analyzer of claim 21, wherein the graphical display view comprises blocks representing broadcast frames and multicast frames.

26. The network analyzer of claim 20, wherein the display view processing device further comprises at least axle input to receive control signals, the control signals controlling which portion of the graphical view is retrieved and how the graphical display view is created.

27. The network analyzer of claim 20, further comprising at least one user input device.

28. A method tar displaying a graphical display view on a graphical user interface, the method comprising:
- displaying a graph illustrating a portion of decode information of a network segment under analysis, the decade information related to characteristics of frames traveling within the network segment, wherein the graph contains a first axis and a second axis, the first axis containing an identification of each individual node of at least a subset of a plurality of nodes within the network segment, the second axis representing time; and
- displaying a graphical representation of each frame being a displayed in association with its respective node at specific times, wherein each individual frame is represented by a separate block.

29. The method of claim 28, wherein the different nodes are represented by horizontal lines.

30. The method of claim 28, wherein the width of each individual block represents the transmission time from one node to another of the frame which each said block represents.

31. The method of claim 28, wherein the blocks comprise a marking scheme representing the protocol of the frame.

32. The method of claim 31, wherein the marking scheme comprises at least one of the group of shading schemes, bordering schemes, cross-hatching schemes, and coloring schemes.

33. The method of claim 28, further comprising arrows that represent the direction of transmission movement of the frames from one node to another.

34. The method of claim 28, further comprising at least one interactive area.

35. The method of claim 34, wherein the at least one interactive area comprises a node scrolling device that is operative to scroll through a list of nodes and a time scrolling device that is operative to scroll though time intervals.

36. The method of claim 34, wherein the at least one interactive area comprises a node selection device that is operative to select a node and a frame selection device that is operative to select a frame.

37. The method of claim 34, wherein the at least one interactive area comprises a node format selection device and a time format selection device, the node format selection device being operative to select from a group consisting of individual nodes and subnets, and the time format selection device being operative to select from a group consisting of absolute time, relative time, and delta time.

38. A method of displaying a graphical display view on a graphical user interface, the method comprising:
- displaying a graph illustrating a portion of decode information of a network segment under analysis, the graph containing a first axis and a second axis, the first axis containing an identification of each individual node of at least a subset of a plurality of nodes within the network segment, the second axis representing time; and
- displaying a graphical representation of each frame displayed in association with its respective node at a specific time;
- wherein each individual frame is represented by a separate block.

39. The method of claim 38, wherein the width of each block represents the transmission time from one node to another of the frame which each said block represents.

40. The method of claim 38, wherein the blocks comprise a marking scheme representing the protocol of the frame, the marking scheme selected from the group consisting of shading schemes, bordering schemes, cross-hatching schemes, and coloring schemes.

* * * * *

UNITED STATES PATENT AND TRADEMARK OFFICE
CERTIFICATE OF CORRECTION

PATENT NO. : 7,607,093 B2 Page 1 of 1
APPLICATION NO. : 10/407341
DATED : October 20, 2009
INVENTOR(S) : Scott Alan Blomquist It is certified that error appears in the above-identified patent and that said Letters Patent is hereby corrected as shown below:

In column 15, line 40, in Claim 6, delete "show" and insert -- shown --, therefor.

In column 15, line 58, in Claim 11, delete "Is" and insert -- is --, therefor.

In column 17, line 41, in Claim 28, delete "tar" and insert -- for --, therefor.

Signed and Sealed this

Twenty-second Day of December, 2009

David J. Kappos
*Director of the United States Patent and Trademark Office*